United States Patent
Kamiya et al.

(10) Patent No.: US 9,371,746 B2
(45) Date of Patent: Jun. 21, 2016

(54) BEARING MEMBER FOR VALVE GEAR

(71) Applicant: TAIHO KOGYO Co., Ltd., Toyota-shi, Aichi (JP)

(72) Inventors: Shu Kamiya, Toyota (JP); Keiji Yuda, Toyota (JP)

(73) Assignee: TAIHO KOGYO CO., LTD. (JP)

( * ) Notice: Subject to any disclaimer, the term of this patent is extended or adjusted under 35 U.S.C. 154(b) by 0 days.

(21) Appl. No.: 14/595,585

(22) Filed: Jan. 13, 2015

(65) Prior Publication Data
US 2015/0211388 A1  Jul. 30, 2015

(30) Foreign Application Priority Data
Jan. 27, 2014  (JP) .................................. 2014-012426

(51) Int. Cl.
| | |
|---|---|
| *F01L 1/04* | (2006.01) |
| *F01L 1/047* | (2006.01) |
| *F16C 33/20* | (2006.01) |
| *F16C 17/02* | (2006.01) |
| *F16C 33/04* | (2006.01) |

(52) U.S. Cl.
CPC ................. *F01L 1/047* (2013.01); *F16C 33/20* (2013.01); *F01L 2001/0476* (2013.01); *F16C 17/02* (2013.01); *F16C 33/046* (2013.01)

(58) Field of Classification Search
CPC . F01L 1/047; F01L 2001/0476; F16C 33/046
USPC ........................ 123/90.16, 90.31, 90.44, 90.6
See application file for complete search history.

(56) References Cited

U.S. PATENT DOCUMENTS 8,051,820 B2 * 11/2011 Shoji ....................... F01L 1/053
123/90.33

FOREIGN PATENT DOCUMENTS

| DE | 2944052 A1 | 5/1980 |
|---|---|---|
| EP | 1217234 A1 | 6/2002 |
| EP | 1837537 A2 | 9/2007 |
| JP | 2010024980 A | 2/2010 |

OTHER PUBLICATIONS

Extended European Search Report for corresponding European patent application No. 15151797.6-1603, dated May 4, 2015.

* cited by examiner

*Primary Examiner* — Ching Chang
(74) *Attorney, Agent, or Firm* — Cantor Colburn LLP

(57) ABSTRACT

To provide a bearing member for a valve gear capable of reducing friction. A bearing member (34) for a valve gear (1) includes a cam shaft (20). The cam shaft (20) has: a cam (30) for opening/closing at least one of an intake valve and an exhaust valve; and a plurality of journal parts (36). The bearing member (34) includes: a cam cap (38) supporting the journal part (36) from above, surrounding it; a bearing base part (40) supporting the journal part (36) from below; and a stepped part (46a) provided on an inner peripheral surface of the cam cap (38) facing the journal part (36), overhanging on an inner peripheral side of the inner peripheral surface. An upstream-side end portion (46c) of the stepped part (46a) is positioned more on a downstream side than an upstream-side abutting surface (38a) of the cam cap (38), whereas a downstream-side end portion (46d) of the stepped part (46a) is positioned more on an upstream side than a downstream-side abutting surface (38b) of the cam cap (38).

3 Claims, 6 Drawing Sheets

BEARING MEMBER FOR VALVE GEAR

CROSS REFERENCE

The present invention claims priority under 35 U.S.C. §119 to Japanese Application No. 2014-12426, filed Jan. 27, 2014, the entire content of which is incorporated herein by reference.

TECHNICAL FIELD

The present invention relates to a technique of a bearing member for a valve gear.

BACKGROUND

Conventionally, an internal combustion engine is provided with a valve gear for opening/closing engine valves such as an intake valve and an exhaust valve. Such valve gear for the internal combustion engine includes a cam shaft and a bearing member. The cam shaft includes: a cam for opening/closing at least one of the intake valve and the exhaust valve; and a plurality of journal parts. The bearing member includes a cam cap and a bearing base part supporting the journal part of the cam shaft, surrounding it.

Conventionally, predetermined clearance is formed between the journal part of the cam shaft and the cam cap, and between the journal part of the cam shaft and the bearing base part, and lubricating oil is supplied to the clearance in order to facilitate smooth rotation of the cam shaft.

For wear resistance between the journal part of the cam shaft and the cam cap, the method of laminating the sliding part between the cam shaft and the cam cap with a resin coating has been disclosed (for example, see Patent Literature 1).

PRIOR ART DOCUMENTS

Patent Literature

Patent Literature 1: the Japanese Patent Laid Open Gazette 2010-24980

SUMMARY OF THE INVENTION

Problems to be Solved by the Invention

However, for the resin coating described in Patent Literature 1, friction between the journal part of the cam shaft and the cam cap has not been reduced sufficiently. That is to say, conventionally, the resin coating is formed in a total range of a slide surface of the cam cap. However, the coating range is too wide to reduce friction sufficiently.

Therefore, taking such problems into consideration, the object of the present invention is to provide a bearing member for a valve gear capable of reducing friction.

Means for Solving the Problems

These are the problems to be solved by the present invention. Next, means for solving the problems will be described.

That is to say, with respect to claim 1, a bearing member for a valve gear includes a cam shaft. The cam shaft has: a cam for opening/closing at least one of an intake valve and an exhaust valve; and a plurality of journal parts. The bearing member includes: a cam cap supporting the journal part from above, surrounding it; a bearing base part supporting the journal part from below; and a stepped part provided on an inner peripheral surface of the cam cap facing the journal part, overhanging on an inner peripheral side of the inner peripheral surface. An upstream-side end portion of the stepped part is positioned more on a downstream side than an upstream-side abutting surface of the cam cap, whereas a downstream-side end portion of the stepped part is positioned more on an upstream side than a downstream-side abutting surface of the cam cap.

With respect to claim 2, the stepped part is formed by a resin coating.

With respect to claim 3, the upstream-side end portion of the stepped part is provided at a position where it is moved more on the downstream side than the upstream-side abutting surface of the cam cap for a predetermined angle of 20≤ and 60≥, whereas the downstream-side end portion of the stepped part is provided at a position where it is moved more on the upstream side than the downstream-side abutting surface of the cam cap for a predetermined angle of 20≤ and 60≥.

Effects of the Invention

The present invention exerts effects described below.

That is to say, since the stepped part is provided on a part of the inner peripheral surface of the cam cap facing the journal part, an oil film thickness increasing area is increased. Accordingly, friction can be reduced.

DESCRIPTION OF EMBODIMENTS

An explanation will be given of embodiments of the present invention.

Figure 1:
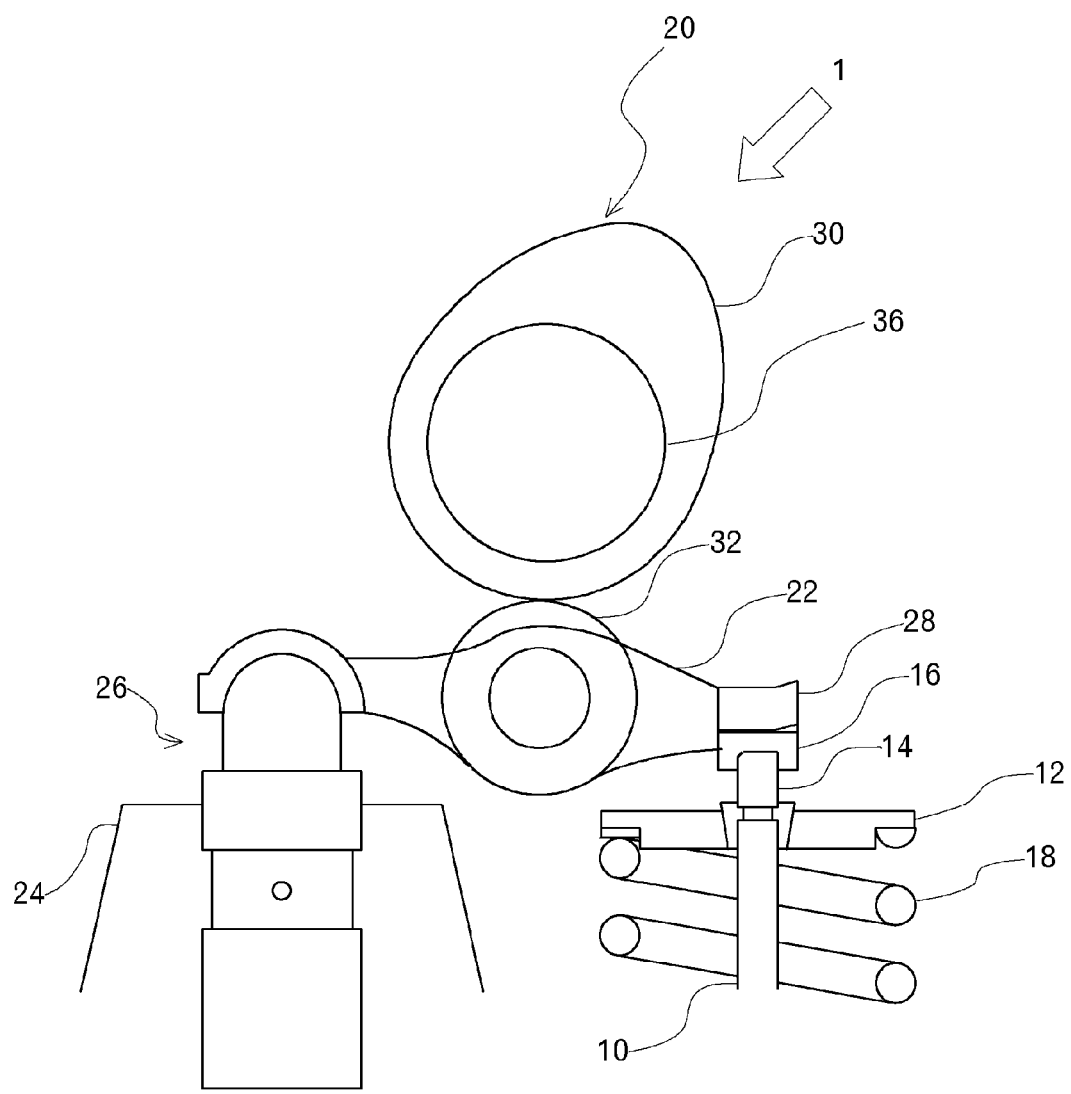
FIG. 1 is a front view illustrating a configuration of a valve gear for an internal combustion engine according to an embodiment of the present invention.

First of all, an explanation will be given of a rocker arm type valve gear which is an example of a valve gear for an internal combustion engine. FIG. 1 is a front view illustrating an example of a configuration of a valve gear for an internal combustion engine according to the present embodiment. With respect to a valve gear 1 for an internal combustion engine, a retainer 12 is attached to a stem 10 of an intake valve (or an exhaust valve), and an end cap 16 is attached to a stem end 14. The stem 10 penetrates the center portion of the disc-shaped retainer 12. The retainer 12 is attached to the stem 10 such that the retainer 12 does not move in the axial direction toward the stem 10. The intake valve (exhaust valve) (not shown) is energized by a coil spring 18 in a compression state provided with the retainer 12 to provide a valve closing state.

The valve gear 1 for the internal combustion engine for opening/closing the intake valve (exhaust valve) (not shown) includes: a cam shaft 20 in which rotation of a crank shaft, an output shaft of the engine, is transmitted; and a rocker arm 22 that is driven by rotation of the cam shaft 20. The rocker arm 22 is manufactured by pressing a formed blank that is obtained by punching out from steel plate.

A first end portion of the rocker arm 22 is supported by a pivot 26 that is provided with a cylinder head 24. A second end portion of the rocker arm 22 is provided with a contact portion 28 through which the rocker arm 22 comes into contact with the end cap 16. Furthermore, for the rocker arm 22, a roller 32 is rotatably supported between the first end portion and the second end portion. The roller 32 comes into contact with a cam 30 of the cam shaft 20.

Accordingly, when the cam shaft 20 is rotated and the roller 32 is pushed by the cam 30, the rocker arm 22 oscillates centered around the pivot 26, whereby the stem end 14 (stem 10) of the intake valve (or the exhaust valve) is pushed by the contact portion 28 of the rocker arm 22. Due to pressing force of the contact portion 28 and energizing force of the coil spring 18, the intake valve (or the exhaust valve) is reciprocatively moved in the axial direction of the stem 10 to perform the opening/closing operation.

Figure 2:
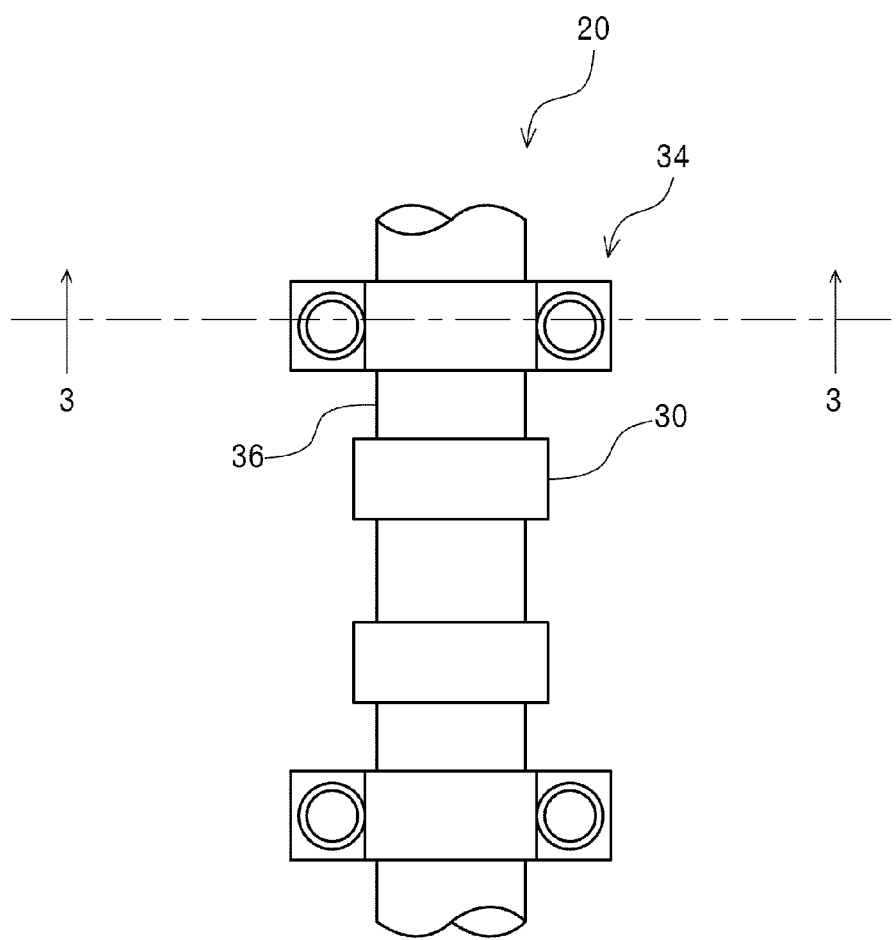
FIG. 2 is a plane view illustrating a configuration of a supporting structure of a cam shaft according to the embodiment of the present invention.
Figure 3:
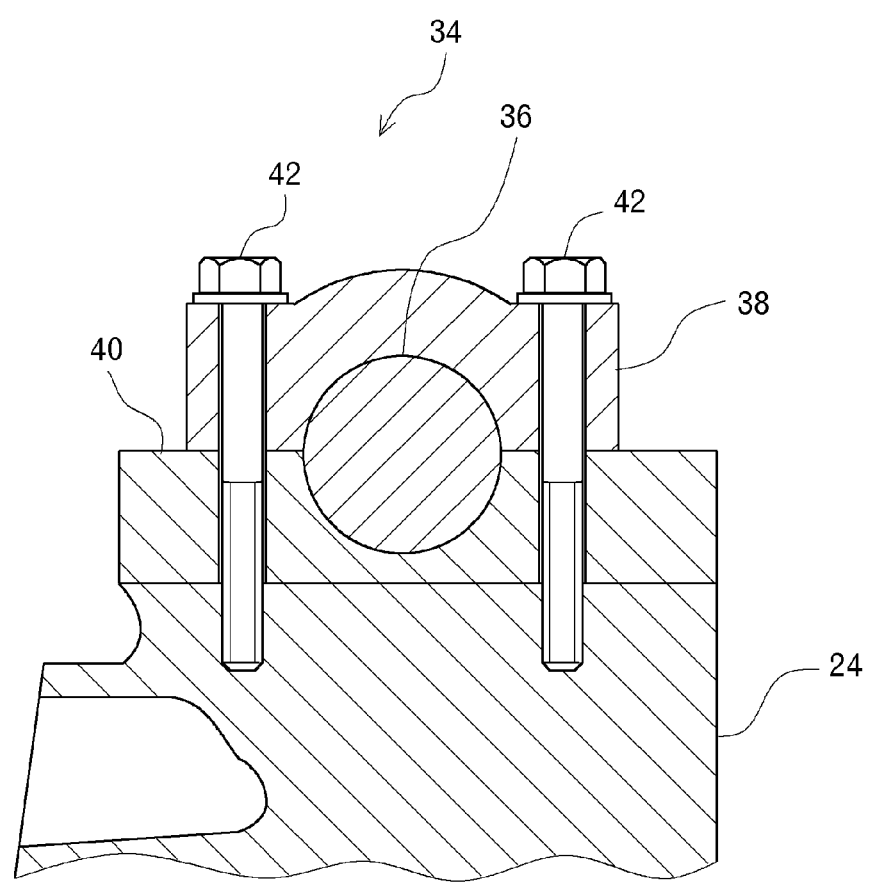
FIG. 3 is a cross sectional view for line 3-3 illustrating the configuration of the supporting structure of the cam shaft according to the embodiment of the present invention.

FIG. 2 is a plane view illustrating a supporting structure of the cam shaft 20 according to one embodiment. FIG. 3 is a cross sectional view for line 3-3 (FIG. 2) illustrating the supporting structure of the cam shaft 20. The valve gear 1 for the internal combustion engine includes a bearing member 34 through which the cam shaft 20 is supported by the cylinder head 24 in such a manner that the cam shaft 20 can rotate around the shaft. The cam shaft 20 includes the cam 30 and a plurality of journal parts 36 (hereinafter, "journal part 36"). As shown in FIG. 3, the bearing member 34 includes a cam cap 38 and a bearing base part 40. The journal part 36 is surrounded by the cam cap 38 and the bearing base part 40. Accordingly, the journal part 36 is supported in a state where the journal part 36 is surrounded by a recess portion of the cam cap 38 and a recess portion of the bearing base part 40. That is to say, the journal part 36 is supported within a circular cylinder space surrounded by the recess portions. The cam cap 38 is fastened to the bearing base part 40 and the cylinder head 24 with fasteners 42 such as bolts etc. A predetermined clearance is provided between the cam cap 38 and the journal part 36, and between the bearing base part 40 and the journal part 36. This clearance is formed to facilitate smooth rotation of the cam shaft 20.

Figure 4:
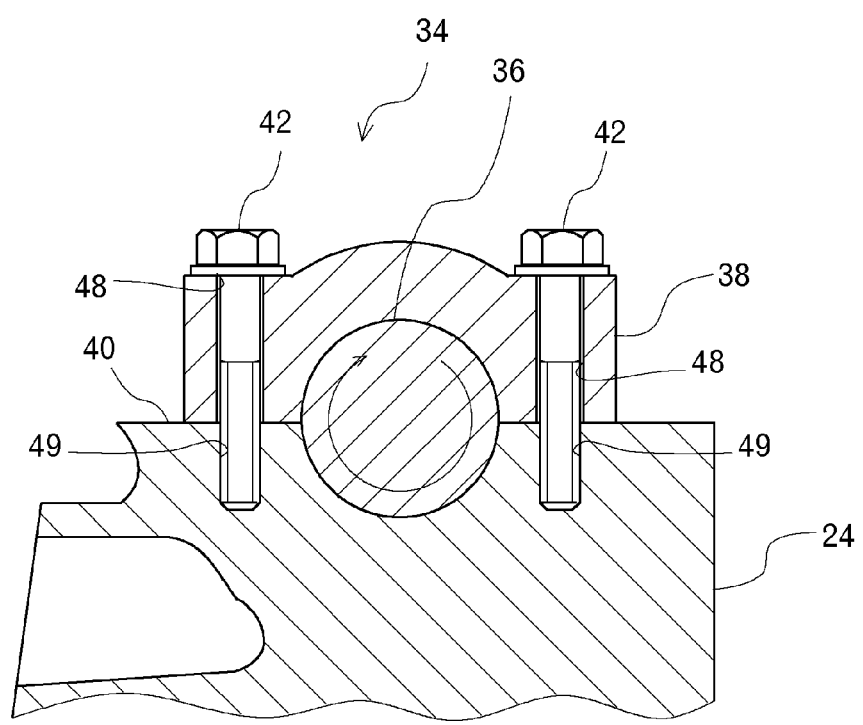
FIG. 4 is a cross sectional view for line 3-3 illustrating a configuration of a supporting structure of the cam shaft according to an another embodiment of the present invention.

FIG. 4 is a cross sectional view for line 3-3 (FIG. 2) illustrating an another embodiment of a supporting structure for the cam shaft 20. As shown in FIG. 4, a part of the cylinder head 24 may constitute a bearing base part 40 of the bearing member 34, whereby the journal part 36 is supported in a state where the journal part 36 is surrounded by the cam cap 38 and the part of the cylinder head 24 (the bearing base part 40). Hereinafter, an example in which the part of the cylinder head 24 is used as the bearing base part 40 will be explained (FIG. 4).

The cam cap 38 is fastened to the bearing base part 40 (the cylinder head 24) with the fasteners 42 such as the bolts etc. Due to a friction force generated by fastening, the cam cap 38 generally receives rotary torque in the clockwise direction. As already explained above, since the predetermined clearance is formed between the cam cap 38 and the journal part 36, the center of the cam cap 38 slips off for the center of the journal part 36 (cam shaft 20) due to the friction force generated by fastening. In that way, the cam cap 38 is fastened to the cylinder head 24 in a state where the cam cap 38 is in contact with the journal part 36.

Figure 5A:
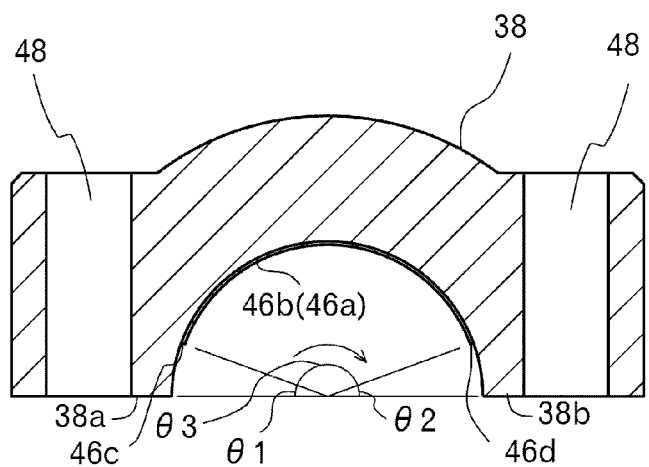
FIG. 5A is a cross sectional view illustrating a configuration of a cam cap when looked from the axial direction of the cam shaft.
Figure 5B:
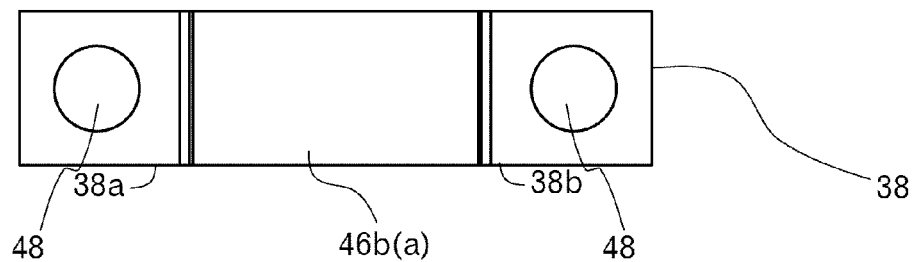
FIG. 5B is a cross sectional view illustrating the configuration of the cam cap when looked from the direction of an abutting surface facing to a bearing base part.

FIG. 5A is a cross sectional view illustrating an example of a configuration of the cam cap 38 when looked from the axial direction of the cam shaft 20, and FIG. 5B is a cross sectional view illustrating the example of the cam cap 38 when looked from an abutting surface facing to the bearing base part 40. As shown in FIG. 5A and FIG. 5B, in the present embodiment, a stepped part 46a is provided on the recess of the cam cap 38, that is to say, on an inner peripheral surface of the cam cap 38 facing the journal part 36. The stepped part 46a is formed in such a manner as to overhang on an inner peripheral side for several μm to several tens μm compared to other parts of the inner peripheral surface of the cam cap 38. The stepped part 46a may be provided by cutting the inner peripheral surface, or by forming a layer on the inner peripheral surface. In the present embodiment, a resin coating layer 46b is provided on the inner peripheral surface of the cam cap 38. Hollow parts shown in FIG. 5A and FIG. 5B are fasten holes 48 in which the fasteners 42 are inserted.

As shown in FIG. 5A and FIG. 5B, the resin coating layer 46b is formed on the inner peripheral surface of the cam cap 38 facing the journal part 36. Here, an upstream-side end portion 46c of the resin coating layer 46b is provided at a position where it is moved more on a downstream side than an upstream-side abutting surface 38a of the cam cap 38 for a first angle θ1. The upstream-side abutting surface 38a is an abutting surface that is located on an upper stream side in the rotating direction of the journal part 36 (cam shaft 20). That is to say, the upstream-side abutting surface 38a is located on the left side in FIG. 5A. Here, the first angle θ1 is made 20 degree or more and 60 degree or less. A downstream-side end portion 46d of the resin coating layer 46b is provided at a position where it is moved more on an upstream side than the downstream-side abutting surface 38b of the cam cap 38 for a second angle θ2. The down-stream side abutting surface 38b is an abutting surface that is located on a lower stream side in the rotating direction of the journal part 36 (cam shaft 20). That is to say, the downstream-side abutting surface 38b is located on the right side in FIG. 5A. Here, the second angle θ2 is made 20 degree or more and 60 degree or less.

Next, an explanation will be given of the resin coating 46b layer.

The resin coating layer 46b is a layer is formed in order to reduce friction and improve resistance to abrasion. The resin coating layer 46b is formed by epoxy, acryl, or phenol etc. resin or the like. The resin coating layer 46b is formed such that the coating thickness is made several μm.

Next, an explanation will be given of effect of reducing friction due to installation of the resin coating layer 46b with reference to FIG. 6A and FIG. 6B.

Figure 6A:
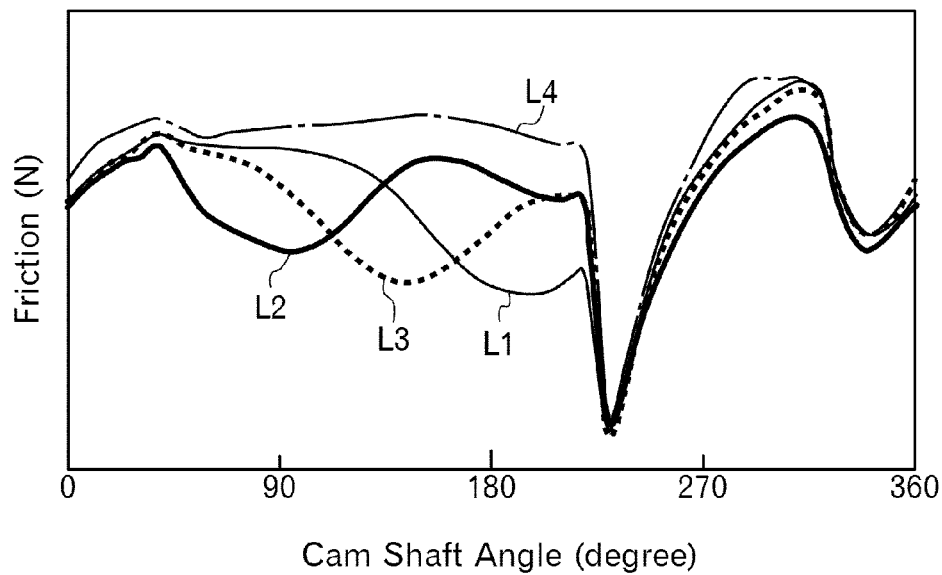
FIG. 6A is a graph showing a relation between cam shaft angle and friction when using the cam cap according to the embodiment of the present invention and cam caps according to comparative examples.

A thin solid line (L1) in FIG. 6A indicates the case where the first angle θ1 is 20 degree and the second angle θ2 is 20 degree. That is to say, the angle θ3 of the area where the inner peripheral surface of the cam cap 38 is covered with the resin coating layer 46b is made 140 degree.

A thick solid line (L2) in FIG. 6A indicates the case where the first angle θ1 is 60 degree and the second angle θ2 is 60 degree. That is to say, the angle θ3 of the area where the inner peripheral surface of the cam cap 38 is covered with the resin coating layer 46b is made 60 degree.

A thick dotted line (L3) in FIG. 6A indicates the case where the first angle θ1 is 40 degree and the second angle θ2 is 40 degree. That is to say, the angle θ3 of the area where the inner peripheral surface of the cam cap 38 is covered with the resin coating layer 46b is made 100 degree.

Figure 6B:
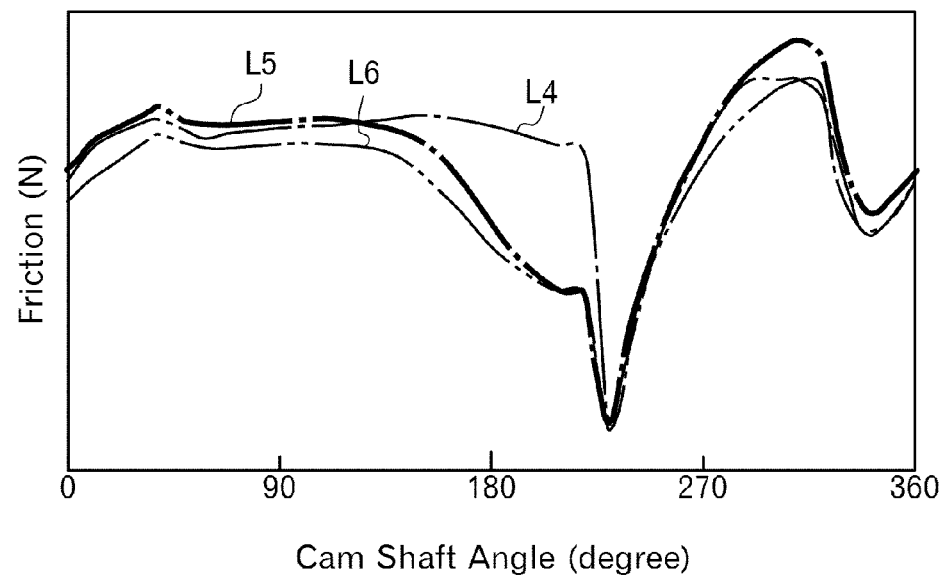
FIG. 6B is a graph showing a relation between cam shaft angle and friction when using cam caps according to comparative examples.

Dot-and-dash thin lines (L4) in FIG. 6A and FIG. 6B indicate the case where the resin coating layer is not formed on the cam cap 38 as a comparative example.

A dot-and-dash thick line (L5) in FIG. 6B indicates the case where the first angle θ1 is 0 degree and the second angle θ2 is 0 degree as a comparative example. That is to say, the angle θ3 of the area where the inner peripheral surface of the cam cap 38 is covered with the resin coating layer 46b is made 180 degree.

A dot-dot-dash thin line (L6) in FIG. 6B indicates the case where the first angle θ1 is 10 degree and the second angle θ2 is 10 degree as a comparative example. That is to say, the angle θ3 of the area where the inner peripheral surface of the cam cap 38 is covered with the resin coating layer 46b is made 160 degree.

As shown in FIG. 6A and FIG. 6B, when the resin coating layer 46b is formed on the cam cap 38 (L1, L2, L3, L5, and L6), effect of reducing friction is achieved compared to the case where the resin coating layer is not formed on the cam cap 38 (L4).

However, as shown in FIG. 6B, with respect to the comparative example in which the angle θ3 of the area where the inner peripheral surface of the cam cap 38 is covered with the resin coating layer 46b is made 180 degree (L5), friction has been high compared to the case where the resin coating layer is not formed on the cam cap 38 (L4) at the cam shaft angle of 0-120 degree and 280-360 degree.

Furthermore, as shown in FIG. 6B, with respect to the comparative example in which the angle θ3 of the area where the inner peripheral surface of the cam cap 38 is covered with the resin coating layer 46b is made 160 degree (L6), friction has been high compared to the case where the resin coating layer is not formed on the cam cap 38 at the cam shaft angle in the vicinity of 300 degree.

As shown in FIG. 6A, when the angle θ3 of the area where the inner peripheral surface of the cam cap 38 is covered with the resin coating layer 46b is made 140 degree (L1), when the angle θ3 of the area where the inner peripheral surface of the cam cap 38 is covered with the resin coating layer 46b is made 60 degree (L2), and when the angle θ3 of the area where the inner peripheral surface of the cam cap 38 is covered with the resin coating layer 46b is made 100 degree (L3), that is, with respect to the present embodiment, effect of reducing friction is achieved compared to the case where the resin coating layer is not formed on the cam cap 38 at all range of the cam shaft angle.

Taking the comparison result into consideration, effect of reducing friction can be more effectively achieved when the first angle θ1 is made 20 degree or more and 60 degree or less, and the second angle θ2 is made 20 degree or more and 60 degree or less.

As mentioned above, The bearing member 34 for the valve gear 1 includes the cam shaft 20. The cam shaft 20 includes: the cam 30 for opening/closing at least one of the intake valve and the exhaust valve; and the plurality of journal parts 36. The bearing member 34 includes: the cam cap 38 supporting the journal part 36 from above, surrounding it; the bearing base part 40 supporting the journal part 36 from below; and the stepped part 46a provided on the inner peripheral surface of the cam cap 38 facing the journal part 36, overhanging on an inner peripheral side of the inner peripheral surface. The upstream-side end portion 46c of the stepped part 46a is positioned more on a downstream side than the upstream-side abutting surface 38a of the cam cap 38, whereas the downstream-side end portion 46d of the stepped part 46a is positioned more on the upstream side than the downstream-side abutting surface 38b of the cam cap 38.

Because of this configuration, by providing the stepped part 46a, an oil film thickness increasing area is increased. Accordingly, friction can be reduced.

Furthermore, the stepped part 46a is formed by the resin coating layer 46b.

Because of this configuration, the stepped part 46a can be easily formed, and the thickness of the stepped part 46a can be easily changed.

Furthermore, the upstream-side end portion 46c of the stepped part 46a is provided at a position where it is moved more on the downstream side than the upstream-side abutting surface 38a of the cam cap 38 for a predetermined angle of 20≤ and 60≥, whereas the downstream-side end portion 46d of the stepped part 46a is provided at a position where it is moved more on the upstream side than the downstream-side abutting surface 38b of the cam cap 38 for a predetermined angle of 20≤ and 60≥.

Because of this configuration, effect of reducing friction can be more effectively achieved.

In the present embodiment, θ1 and θ2 is made such that θ1 is identical to θ2. However, θ1 and θ2 do not always need to be identical. Instead, for example, it is possible to set θ1 to be 20 degree angle, and set θ2 to be 60 degree angle.

DESCRIPTION OF NOTATIONS 1 valve gear
20 cam shaft
30 cam
34 bearing member
36 journal part
38 cam cap
40 bearing base part
46a stepped part
46b resin coating layer

What is claimed is:

1. A bearing member for a valve gear comprising a cam shaft,
   the cam shaft having:
   a cam for opening/closing at least one of an intake valve and an exhaust valve; and
   a plurality of journal parts, characterized in
   the bearing member including:
   a cam cap supporting the journal part from above, surrounding it;
   a bearing base part supporting the journal part from below; and
   a stepped part provided on an inner peripheral surface of the cam cap facing the journal part, overhanging on an inner peripheral side of the inner peripheral surface, wherein
   an upstream-side end portion of the stepped part is positioned more on a downstream side than an upstream-side abutting surface of the cam cap, whereas
   a downstream-side end portion of the stepped part is positioned more on an upstream side than a downstream-side abutting surface of the cam cap.

2. The bearing member for the valve gear as set forth in claim 1, characterized in that the stepped part is formed by a resin coating.

3. The bearing member for the valve gear as set forth in claim 1, characterized in that the upstream-side end portion of the stepped part is provided at a position where it is moved more on the downstream side than the upstream-side abutting surface of the cam cap for a predetermined angle of 20≤ and 60≥, whereas the downstream-side end portion of the stepped part is provided at a position where it is moved more on the upstream side than the downstream-side abutting surface of the cam cap for a predetermined angle of 20≤ and 60≥.

* * * * *